US011074144B2

(12) United States Patent
Muroyama et al.

(10) Patent No.: US 11,074,144 B2
(45) Date of Patent: Jul. 27, 2021

(54) ACTIVE FIRMWARE REPLACEMENT IN STORAGE SYSTEM AND IN STORAGE CONTROLLER, AND COMPUTER-READABLE RECORDING MEDIUM HAVING STORED THEREIN PROGRAM FOR ACTIVE FIRMWARE REPLACEMENT IN CONTROLLING STORAGE

(71) Applicant: FUJITSU LIMITED, Kawasaki (JP)

(72) Inventors: Tomohiko Muroyama, Kawasaki (JP); Masahiro Yoshida, Kawasaki (JP); Atsushi Takakura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 152 days.

(21) Appl. No.: 16/173,444

(22) Filed: Oct. 29, 2018

(65) Prior Publication Data

US 2019/0155704 A1   May 23, 2019

(30) Foreign Application Priority Data

Nov. 22, 2017   (JP) .............................. JP2017-225027

(51) Int. Cl.
*G06F 11/00* (2006.01)
*G06F 11/20* (2006.01)
(Continued)

(52) U.S. Cl.
CPC ........ *G06F 11/2005* (2013.01); *G06F 3/0614* (2013.01); *G06F 3/0649* (2013.01);
(Continued)

(58) Field of Classification Search
CPC ............ G06F 11/2005; G06F 11/2023; G06F 11/203; G06F 11/2033; G06F 11/3034;
(Continued)

(56) References Cited

U.S. PATENT DOCUMENTS 6,954,881 B1 * 10/2005 Flynn, Jr. .............. G06F 3/0617
714/43
7,500,134 B2 * 3/2009 Madnani ............... G06F 3/0617
714/6.2
(Continued)

FOREIGN PATENT DOCUMENTS

JP   2005-63050    3/2005
JP   2008-186296   8/2008
(Continued)

*Primary Examiner* — Elmira Mehrmanesh
(74) *Attorney, Agent, or Firm* — Fujitsu Patent Center

(57) ABSTRACT

Before an active program replacement is carried out, a storage controller confirms a communication state between a redundant storage controller having a redundant configuration with the storage controller and the second storage device, and prohibits, in a case where an abnormality is detected in the communication state between the redundant storage controller and the second storage device, the active program replacement of the first storage controller. This inhibits occurrence of system down when active firmware replacement process is to be carried out in a storage system including multiple storage devices connected to one another.

13 Claims, 8 Drawing Sheets

(51) Int. Cl.
*G06F 3/06* (2006.01)
*G06F 11/32* (2006.01)
*G06F 11/30* (2006.01)

(52) U.S. Cl.
CPC ........ *G06F 3/0683* (2013.01); *G06F 11/3034* (2013.01); *G06F 11/3055* (2013.01); *G06F 11/327* (2013.01)

(58) Field of Classification Search
CPC ............. G06F 11/3055; G06F 11/1433; G06F 11/3051
See application file for complete search history.

(56) References Cited

U.S. PATENT DOCUMENTS

| | | | | |
|---|---|---|---|---|
| 7,730,274 | B1* | 6/2010 | Usgaonkar | G06F 11/2092 711/163 |
| 7,881,185 | B1* | 2/2011 | Karl | H04L 45/02 370/216 |
| 8,010,713 | B2* | 8/2011 | Matumura | G06F 8/656 710/8 |
| 8,443,119 | B1* | 5/2013 | Limaye | G06F 11/2023 710/15 |
| 8,443,232 | B1* | 5/2013 | Nagineni | G06F 11/2092 714/13 |
| 8,707,085 | B2* | 4/2014 | Bodke | G06F 11/1423 714/4.11 |
| 8,713,553 | B2* | 4/2014 | Suzuki | G06F 11/2089 717/168 |
| 8,745,614 | B2* | 6/2014 | Banerjee | G06F 8/654 717/173 |
| 8,966,466 | B2* | 2/2015 | Tiwari | G06F 8/656 717/168 |
| 9,015,519 | B2* | 4/2015 | Anthonisamy | G06F 11/2005 709/203 |
| 10,445,197 | B1* | 10/2019 | Harpreet | H04L 41/0654 |
| 2005/0036348 | A1 | 2/2005 | Aoyama | |
| 2008/0184217 | A1 | 7/2008 | Kai | |
| 2008/0215910 | A1* | 9/2008 | Gabriel | H04L 43/0811 714/4.1 |
| 2010/0162223 | A1* | 6/2010 | Hattori | G06F 8/656 717/168 |
| 2010/0318986 | A1* | 12/2010 | Burke | G06F 21/16 717/176 |
| 2012/0084508 | A1 | 4/2012 | Suzuki | |
| 2013/0272109 | A1* | 10/2013 | Qiu | H04L 41/0654 370/216 |
| 2015/0278052 | A1* | 10/2015 | Hatano | G06F 11/3034 714/6.3 |
| 2015/0347124 | A1* | 12/2015 | Sotani | G06F 8/654 717/170 |
| 2015/0363286 | A1* | 12/2015 | Blea | G06F 11/2058 714/6.3 |
| 2016/0062761 | A1 | 3/2016 | Muroyama et al. | |

FOREIGN PATENT DOCUMENTS

| | | |
|---|---|---|
| JP | 2008-299709 | 12/2008 |
| JP | 2012-79175 | 4/2012 |
| JP | 2016-53855 | 4/2016 |

* cited by examiner

ACTIVE FIRMWARE REPLACEMENT IN STORAGE SYSTEM AND IN STORAGE CONTROLLER, AND COMPUTER-READABLE RECORDING MEDIUM HAVING STORED THEREIN PROGRAM FOR ACTIVE FIRMWARE REPLACEMENT IN CONTROLLING STORAGE

CROSS-REFERENCE TO RELATED APPLICATION

This application is based upon and claims the benefit of priority of the prior Japanese Patent application No. 2017-225027, filed on Nov. 22, 2017, the entire contents of which are incorporated herein by reference.

FIELD

The embodiment discussed herein is directed (related) to a storage system, a storage controller, and a non-transitory computer-readable recording medium having stored therein a program for controlling storage.

BACKGROUND

A storage virtualization technique has recently been known which integrates logical volumes of multiple storage devices to configure a logical storage pool. Such a storage virtualization technique makes it possible to reduce load on the system operation and to facilitate data migration between storage devices. For that aspect, a storage virtualization technique is an important function for its capability of integrally managing multiple storage devices.

A storage device is provided with many modules (electronic parts and devices). For example, a Drive Enclosure (DE) that stores a storing device such as a Hard Disk Drive (HDD) is provided with modules such as an Input Output Module (IOM) and a Fan Expander Module (FEM). The recent increasing of the capacity and the density of storage accompanies increase of number of the modules to be mounted on a storage device.

In each of such modules, firmware is executed. For stable and efficient operation of a storage device and using a new function, the latest firmware needs to be applied to the module.

It is preferable that firmware is applied to all the modules mounted on a storage device while the device is kept to be in the operating state. Accordingly, a function for applying firmware to a module is highly important.

As described above, a storage device includes multiple modules, which operate using respective firmware independent of one another. A typical module includes two regions of an operating-side region and a non-operating-side region to store therein firmware.

When firmware (hereinafter referred to as new firmware) for updating is to be applied to a module, the new firmware is firstly written into a non-operating-side region. After that, the non-operating-side region having written therein the new firmware is switched into an operating-side region, and then the module is reset (rebooted or restarts) and started using the new firmware written into the operating-side region. Hereinafter, application of new firmware is sometimes referred to as replacing or version-updating the firmware.

A process of replacing the firmware while the system is kept to be in the operating state is sometimes referred to as an active firmware replacement process. In the active firmware replacement process, it is preferable that the multiple modules are classified into two groups of a first-half module group and a second-half module group, and either one of the groups undergoes firmware replacement at a time while the online state of the system is being kept.

[Patent Literature 1] Japanese Laid-open Patent Publication No. 2008-186296
[Patent Literature 2] Japanese Laid-open Patent Publication No. 2005-63050
[Patent Literature 3] Japanese Laid-open Patent Publication No. 2008-299709
[Patent Literature 4] Japanese Laid-open Patent Publication No. 2012-79175
[Patent Literature 5] Japanese Laid-open Patent Publication No. 2016-53855

In a storage system provided with multiple storage devices, connection of one of the redundant paths between storage devices may sometimes come to be in a disconnected state for some reasons.

In the course of an active firmware replacement process, when the first-half module groups are restarted after new firmware is written, there is a possibility that both the redundant paths come into the disconnected state.

If the both paths come into the disconnected state, some connection structure between the storage devices or methods for managing volumes may completely loos the connecting information between the storage device, resulting in system down while the system is operating.

SUMMARY

According to an aspect of the embodiment, a storage system includes a first storage device that is communicably connected to a host device; and a second storage device that is communicably connected to the first storage device and that performs a process through the first storage device in response to an access request from the host device. The first storage device comprises a first storage controller and a second storage controller, the first storage controller and the second controller being redundantly connected to the host device. The first storage controller and the second controller are redundantly connected to the second storage device. Before the first storage controller disconnects a connection from the second storage device to carry out active program replacement, the first storage controller confirms a communication state between the second storage controller and the second storage device. In a case where an abnormality is detected in the communication state between the second storage controller and the second storage device, the active program replacement of the first storage controller is prohibited.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Hereinafter, description will now be made in relation to a storage system, a storage controller, and a non-transitory computer-readable recording medium having stored therein a program for controlling storage according to an embodiment with reference to the accompanying diagram. The following embodiment is merely exemplary and has no intention to exclude various modifications and applications of techniques not referred in the following embodiment. The following embodiment may be variously modified (e.g., combining embodiments and modifications) without departing from the scope thereof. The drawings do not restrict elements to those appearing therein but may contain additional elements and functions.

Figure 8:
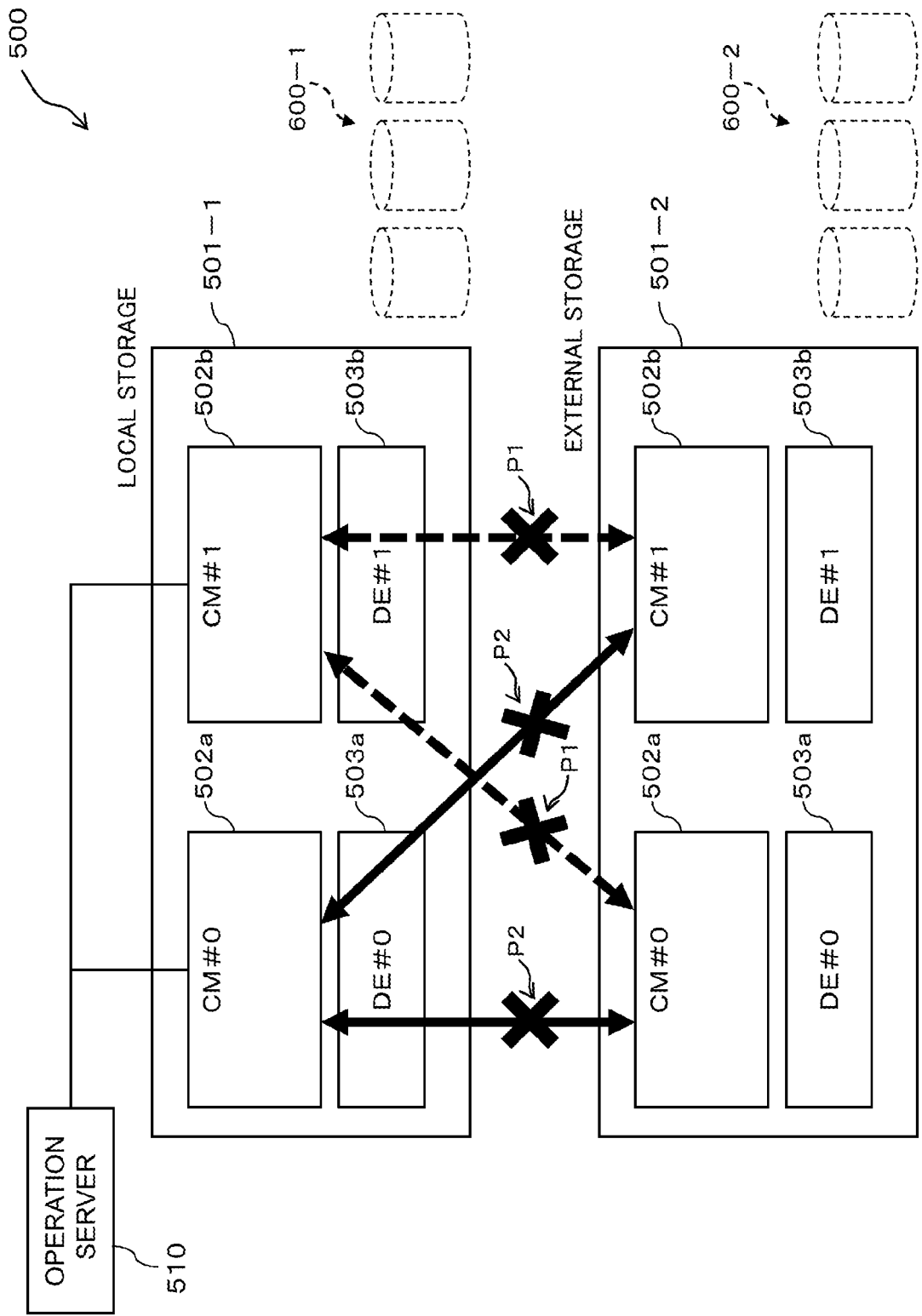
FIG. 8 is a diagram illustrating an example of the configuration of a storage system that achieves storage virtualization.

(A) Overview:

FIG. 8 is a diagram illustrating an example of the configuration of a storage system 500 that achieves storage virtualization.

The storage system 500 includes a local storage 501-1 and an external storage 501-2 that is externally installed and that is connected to the local storage 501-1 through a network.

The local storage 501-1 is a storage device that is connected to an operation server 510 and that provides logical volumes 600-1 to the operation server 510.

The external storage 501-2 is connected to the operation server 510 through the local storage 501-1. Specifically, a storage device directly connected to the operation server 510 is the local storage 501-1 and a storage device indirectly connected to the operation server 510 via the local storage 501-1 is the external storage 501-2. There is no need to arrange the external storage 501-2 remotely in position from the local storage 501-1. The local storage 501-1 and the external storage 501-2 may be arranged in, for example, the same server room. In addition, the operation server 510 may also be arranged in the same server room.

The local storage 501-1 includes redundant Controller Modules (CMs) 502a and 502b, and redundant DEs 503a and 503b.

The DEs 503a and 503b each includes one or more storing devices such as HDDs not appearing in the drawings. The DE 503a and the DE 503b may sometimes be referred to as a DE #0 and a DE #1, respectively.

The CMs 502a and 502b are storage controllers that carry out various controls, and carry out various controls such as access control to the storing devices of the DEs 503a and 503b in response to a storage access request (hereinafter sometimes referred to as a host I/O) from the operation server 510. For example, the CMs 502a and 502b generate one or more logical volumes 600-1 using storing regions of the storing devices of the DEs 503a and 503b, and provide the generated logical volume to the operation server 510.

The CMs 502a and 502b process a host I/O that the operation server 510 issues to a logical volume 600-1 and read and write data into and from the storing devices of the DEs 503a and 503b.

The CMs 502a and 502b are duplicated and for example, the CM 502a functions as the primary CM to carry out various controls. In the event of breakdown of the primary CM 502a, the secondary CM 502b comes to function as the primary CM and takes over the operation of the CM 502a. The CM 502a and the CM502b may sometimes be referred to as a CM #0 and a CM #1, respectively.

The external storage 501-2 is connected to the local storage 501-1 via a network.

The external storage 501-2 generates one or more logical volumes 600-2.

The local storage 501-1 incorporates the logical volumes 600-2 of the external storage 501-2 as the logical volumes into the local storage 501-1 and issues a host I/O from the operation server 510 to the external storage 501-2. Thereby, the operation server 510 becomes capable of using the logical volumes 600-2 of the external storage 501-2.

The local storage 501-1 taking over the device information of the external storage 501-2 makes the operation server 510 possible to recognize the local storage 501-1 as the external storage 501-2. Likewise the local storage 501-1, the external storage 501-2 includes redundant CMs 502a and 502b and redundant DEs 503a and 503b. Like reference numbers designate same or substantially same elements and parts throughout the drawings, so repetitious description is omitted here.

The local storage 501-1 and the external storage 501-2 are connected to each other via redundant paths in the network, and in the event of disconnection of either one of the paths, can continuously communicate an I/O with each other via the other path.

For example, when the local storage 501-1 and the external storage 501-2 are to be undergo firmware replacement, rebooting either one of redundant CMs 502a and 502b at a time can achieve the replacement. When the CMs 502a and 502b are rebooted, a volume incorporation process is carried out again.

In the configuration of FIG. 8, rebooting the CM #0 or the CM #1 in the local storage 501-1 temporarily loses the path connections between the rebooted CM #0 or CM #1 and the external storages 502a and 502b.

For example, it is assumed that, during rebooting the CM #1 of the local storage 501-1, the path connections of the CM #1 therein to the CM #0 and the CM #1 of the external storage 501-2 are disconnected for some reasons (see reference number P1 in FIG. 8).

The CM #0 of the local storage 501-1 is assumed to be rebooted by means of active firmware replacement under a state where the above disconnected state of the paths is not restored (see reference number P1) after the completion of rebooting of the CM #1 of the local storage 501-1.

In the above circumstance, the paths that connect the CM #0 of the local storage 501-1 to the CM #0 and the CM #1 of the external storage 501-2, that is the redundant paths, come into the disconnected state (see reference number P2 in FIG. 8). Consequently, the path connections between the local storage 501-1 and the external storage 501-2 are lost.

In cases where the paths through which a host I/O from the operation server 510 flows to the external storage 501-2 are disabled like the above, the host I/O abnormally terminates and resulting in system down.

Figure 1:
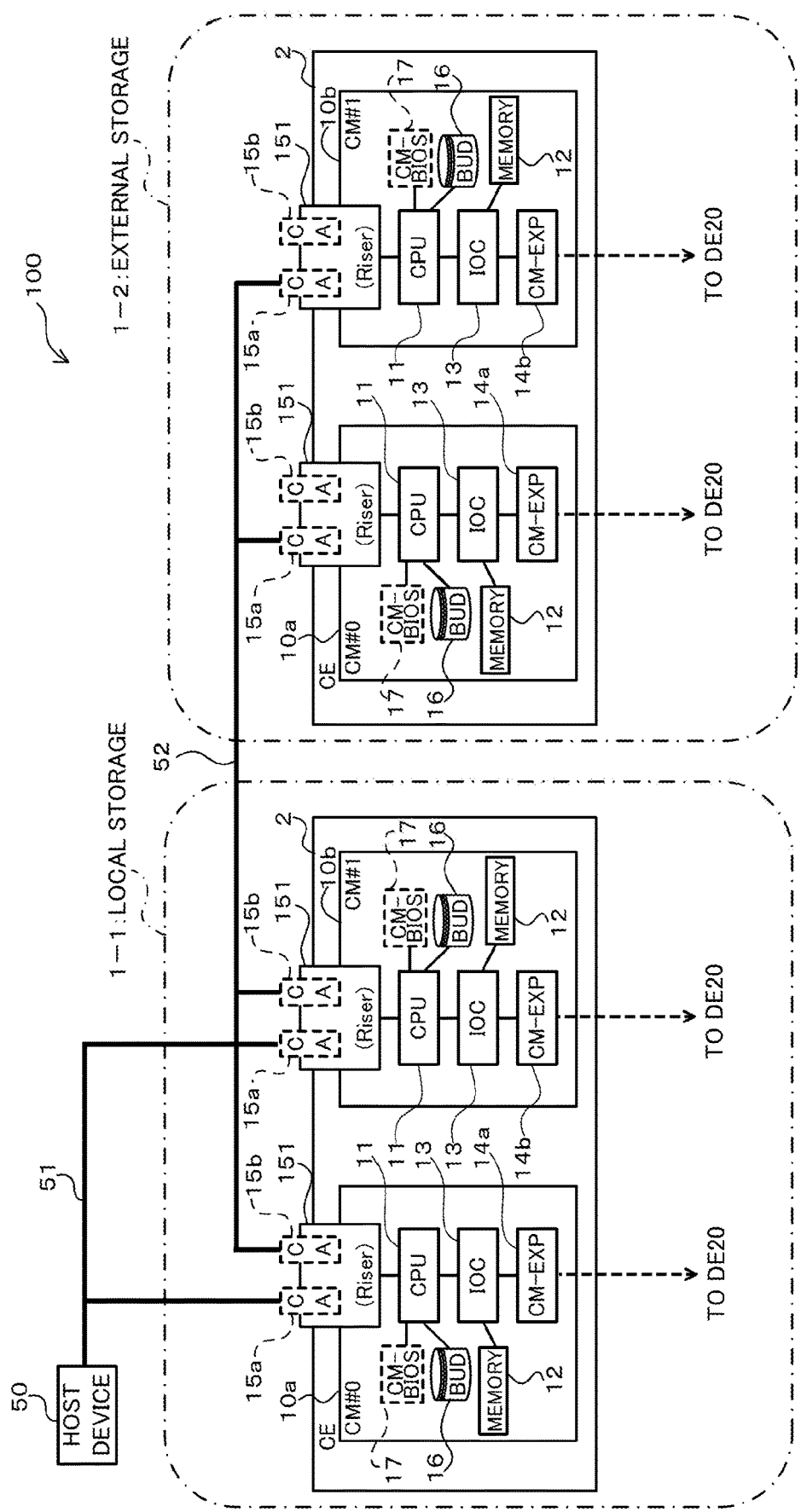
FIG. 1 is a diagram schematically illustrating the configuration of a connecting state of multiple storage devices in a storage system according to an example of an embodiment.
Figure 2:
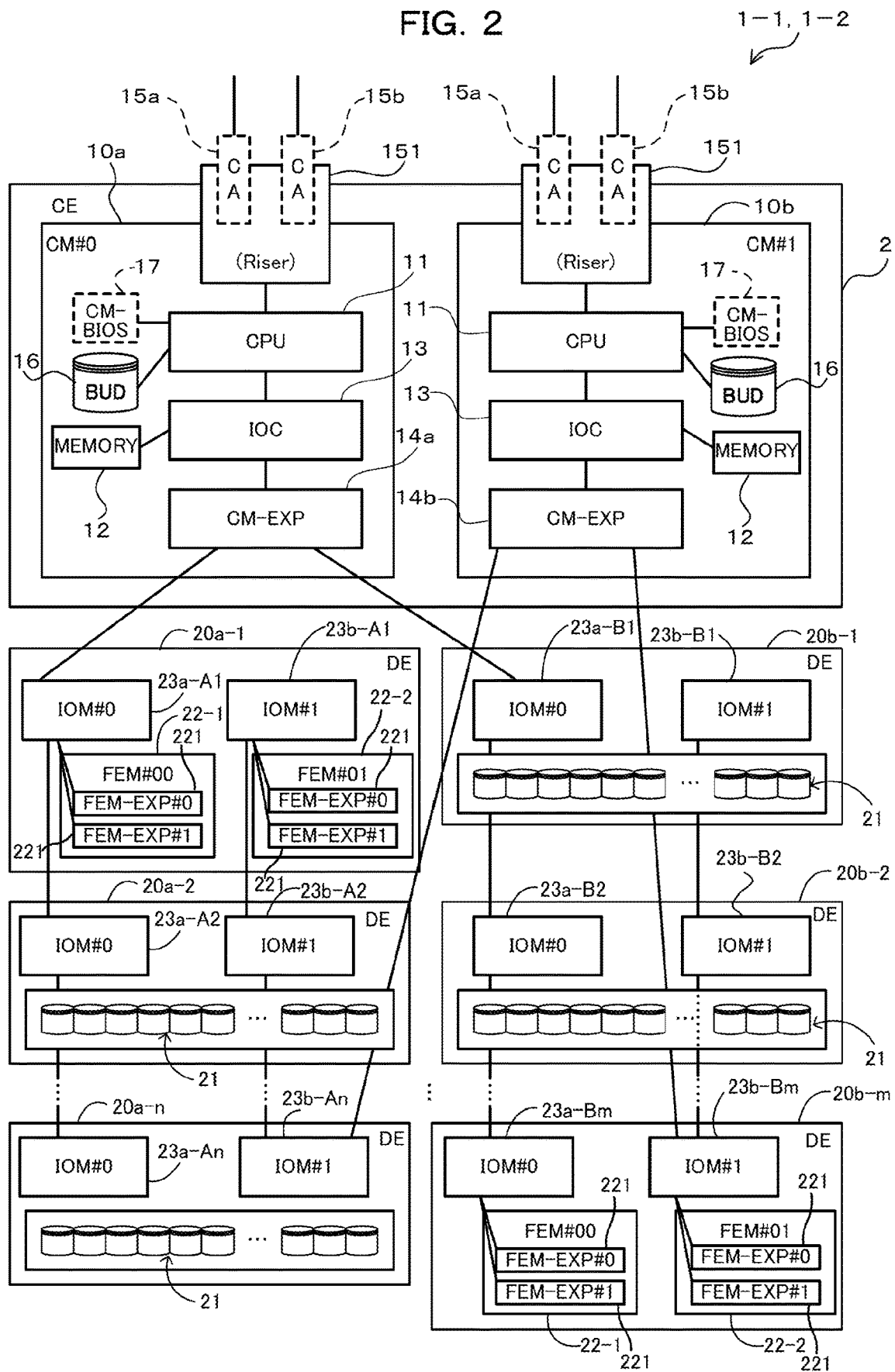
FIG. 2 is a diagram illustrating an example of the hardware configuration of a storage device in a storage system according to an example of an embodiment.
Figure 3:
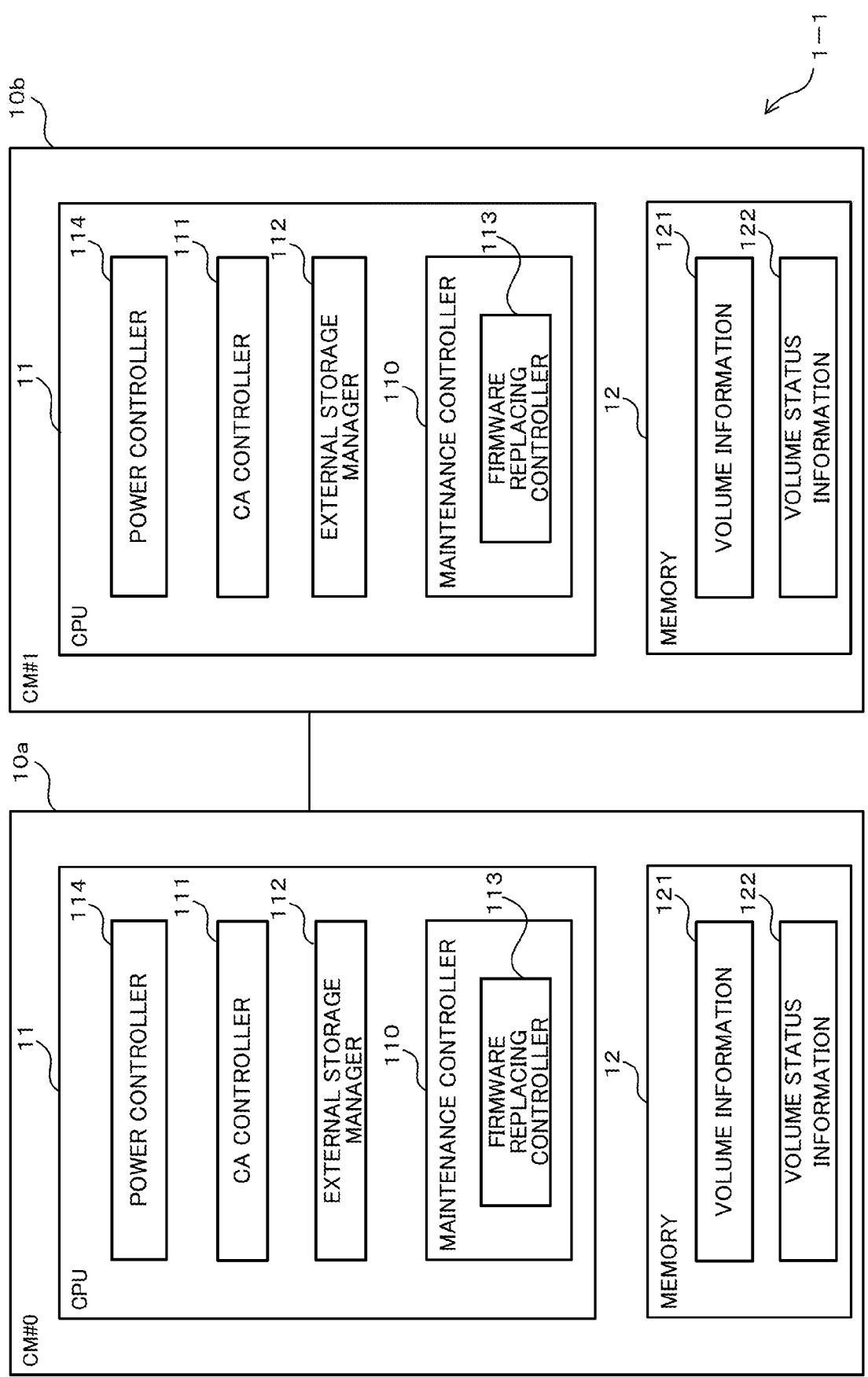
FIG. 3 is a diagram illustrating an example of the functional configuration of a local storage of a storage system according to an example of an embodiment.

(B) Device Configuration:

FIG. 1 is a diagram illustrating a configuration of the connecting state of storage devices 1-1 and 1-2 of a storage system 100 according to an example of an embodiment; FIG. 2 is a diagram illustrating an example of the hardware configuration of the storage devices 1-1 and 1-2 of the storage system 100 of an example of an embodiment; and FIG. 3 is a diagram illustrating an example of the functional configuration of the storage device 1-1 of the storage system 100 of an example of an embodiment.

The storage system 100 according to an example of the present embodiment is communicably connected to one or more (one in the example of FIG. 1) host devices 50 through a communication line 51, and provides a storing region to the host device 50. An example of the communication line 51 is a Local Area Network (LAN) cable.

The storage system 100 exemplarily illustrated in FIG. 1 includes two storage devices 1-1 and 1-2.

To each host device 50, the storage device 1-1 is connected through the communication line 51; and to the storage device 1-1, the storage device 1-2 is connected through a communication line 52. Accordingly, the storage device 1-2 is indirectly connected to the host devices 50 through the storage device 1-1. The host device 50 may be an operation server.

The storage devices 1-1 and 1-2 provide the host device 50 with storing regions, and each have a function for generating and managing one or more logical volumes (not illustrated).

The storage device 1-1 provides the host device 50 with a virtual volume (not illustrated).

The storage device 1-1 functions as an initiator that issues an instruction to the storage device 1-2 while the storage device 1-2 functions as a target of the storage device 1-1.

Hereinafter, the storage device 1-1 and the storage device 1-2 may sometimes be referred to as a local storage 1-1 and the external storage (remote storage) 1-2, respectively.

For example, incorporating a logical volume (not illustrated) of the external storage 1-2 into the local storage 1-1 can cause the host device 50 to recognize that the data in the external storage 1-2 is located in the local storage 1-1. The storage system 100 here integrally manages two independent storage devices 1-1 and 1-2 and is different in connecting configuration and method for managing from a system in which a master storage device or a control casing of the master storage device collectively manages multiple device casing.

Using its function as the initiator, the local storage 1-1 forwards a host I/O from the host device 50 to the external storage 1-2 and thereby allows the host device 50 to use the logical volumes of the external storage 1-2.

For example, a logical volume of the local storage 1-1 may be mirrored in the external storage 1-2. The storage system 100 illustrated in FIG. 1 may be configured in order to migrate a logical volume of the external storage 1-2 into the local storage 1-1.

The external storage 1-2 has the same configuration as that of the local storage 1-1. Hereinafter, the reference number 1-1 or 1-2 is used when one of the multiple storage devices needs to be specified, but a reference number 1 is used to refer to an arbitrary storage device.

Like reference numbers designate the same or substantially same parts and elements throughout the drawings, so repetitious description is omitted here.

The storage device 1 mounts thereon multiple storing devices 21 (see FIG. 2) that are to be detailed below, distributes data to the multiple storing devices 21 using Redundant Arrays of Inexpensive Disks (RAID) to store the data in a state of being redundant. The storage device 1 includes CEs 2, each to which a DE 20 serving as internal storage is connected.

In the example of FIG. 2, each storage device 1 includes multiple DEs 20a-1 to 20a-n, and 20b-1 to 20b-m (where the symbols n and m represent natural numbers).

Hereinafter, one of the reference numbers 20a-1 to 20a-n, and 20b-1 to 20b-m is used when one of the multiple DEs needs to be specified, but a reference number 20 is used to refer to an arbitrary storage device.

The CE 2 includes multiple (two in the example of FIG. 1) CMs 10a and 10b.

The CMs 10a and 10b are controllers (storage controllers) that control the operation in the storage device 1, and carry out various controls such as data access control to the storing devices 21 in the DEs 20 in response to an I/O request transmitted from the host device 50 and the like.

The CMs 10a and 10b are duplicated and for example, one (e.g., the CM 10a) of the CMs functions as the primary CM to carryout various controls. In the event of breakdown of the primary CM 10a, the secondary CM 10b comes to function as the primary CM and takes over the operation of the CM 10a. The CMs 10a and 10b have a redundant configuration (redundant-path configuration).

The CMs 10a and 10b have the same configuration. Hereinafter, the reference number 10a or 10b is used when one of the multiple CMs needs to be specified, but a reference number 10 is used to refer to an arbitrary CM. The CM 10a and the CM 10b may sometimes be referred to as a CM #0 and a CM #1, respectively.

The CM #0 and the CM #1 are communicably connected to each other via a non-illustrated internal bus. The internal bus may perform the communication conforming to, for example, the standard of the Peripheral Component Interconnect Express (PCIe) or another standard. Each CM10 is communicably connected to each DE 20 via a bus line (a data access path).

As illustrated in FIG. 2, the DEs 20 are device casings accommodating the storing devices 21 and IOM 23a-A1 to 23a-An, 23b-A1 to 23b-An, 23a-B1 to 23a-Bm, and 23b-B1 to 23b-Bm.

Each DE 20 is communicably connected to the two CMs #0 and #1 through data access paths, and includes two IOMs 23 and multiple storing devices 21 or FEMs 22.

Hereinafter, one of the reference numbers 23a-A1 to 23a-An, 23b-A1 to 23b-An, 23a-B1 to 23a-Bm, and 23b-B1 to 23b-Bm is used when one of the multiple IOMs needs to be specified, but a reference number 23 is used to refer to an arbitrary IOM.

In the example of FIG. 2, the DE 20a-1 and the DE 20b-m each include two FEMs 22-1 and 22-2, and the remaining DEs 20 each include multiple storing devices 21.

Each storing device 21 is a publicly-known device that readably and writably stores data and is exemplified by an HDD or a Solid State Drive (SSD). The storing device 21 have the same configuration and function. Some of the storing devices 21 included in each DE 20 function as hot spears.

Hereinafter, one of the reference numbers 22-1 and 22-2 is used when one of the multiple FEMs needs to be specified, but a reference number 22 is used to refer to an arbitrary FEM.

An FEM 22 carries out a process that forwards a Serial Attached Small Computer System Interface (SAS) frame that the IOM 23 in the same DE 20 receives to a storing device 21 designated by the CM 10. The FEM 22 mounts thereon a non-illustrated fan and cools inside the DE 20. An example of the FEM 22 is a module mounting thereon a second tier expander for a 3.5-inchi high-density drive enclosure.

Each FEM 22 includes one or more (two in the example of FIG. 2) EFM-Expanders (FEM-EXPs) 221. An FEM-EXP 221 is an Expander chip for SAS/SATA (Serial Advanced Technology Attachment) connection.

The DE 20a-1 includes the IOMs 23a-A1 and 23b-A1. Likewise, the DE 20a-2 includes the IOMs 23a-A2 and 23b-A2; the DE 20a-n includes the IOMs 23a-An and 23b-An; the DE 20b-1 includes the IOMs 23a-B1 and 23b-B1; the DE 20b-2 includes the IOMs 23a-B2 and 23b-B2; and the DE 20b-m includes the IOMs 23a-Bm and 23b-Bm. Consequently, the IOMs 23 have a redundant configuration in each DE 20.

In the DE 20a-1, the IOM 23a-A1 controls the FEM 22-1, and the IOM 23b-A1 controls the FEM 22-2. Likewise, in the DE 20b-m, the IOM 23a-Bm controls the FEM 22-1, and the IOM 23b-Bm controls the FEM 22-2.

In the DE20a-2, the IOMs 23a-A2 and 23b-A2 control data access to the storing devices 21. Likewise, in the DE 20a-n, the IOMs 23a-An and 23b-An control data access to the storing devices 21; in the DE 20b-1, the IOMs 23a-B1 and 23b-B1 control data access to the storing devices 21; and in the DE 20b-2, the IOMs 23a-B2 and 23b-B2 control data access to the storing devices 21.

To the CM-EXP 14a of the CM 10a (CM #0) that is to be detailed below, the IOM 23a-A1, the IOM and the IOM 23a-An are cascaded in this sequence. To the CM-EXP 14a, the IOM 23a-B1, the IOM 23a-B2, . . . , and the IOM 23a-Bm are cascaded in this sequence.

The path through which the IOM 23a-A1, the IOM 23a-A2, . . . , and the IOM 23a-Am are cascaded from the CM-EXP 14a of the CM 10a and the path through which the IOM 23a-B1, the IOM 23a-B2, . . . , the IOM 23a-Bm are cascaded from the CM-EXP 14a of the CM 10a are sometimes referred to as 0-series paths. Here, an IOM 23 connected to the 0-series paths is sometimes referred to as an IOM #0.

Each IOM 23 connected to a 0-series path is managed by the 0-series CM 10a (CM #0).

In addition, to the CM-EXP 14b of the CM 10b (CM #1) that is to be detailed below, the IOM 23b-Bm, . . . , the IOM 23b-B2, and the IOM 23b-B1 are cascaded in this sequence. To the CM-EXP 14b, the IOM 23b-An, . . . , the IOM 23b-A2, and the IOM 23b-A1 are cascaded in this sequence.

The path through which the IOM23b-Bm, . . . , the IOM 23b-B2, and the IOM 23b-B1 are connected from the CM-EXP 14b of the CM 10b and the path through which the IOM 23b-An, the IOM 23b-A2, and the IOM 23b-A1 are connected from the CM-EXP 14b of the CM 10b are sometimes referred to as 1-series paths. Here, an IOM 23 connected to the 1-series paths is sometimes referred to as an IOM #1.

The IOMs 23 connected to the 1-series paths are managed by the 1-series CM 10b (CM #1). The 1-series paths are rebus-cabled to the 0-series paths.

A CM 10 is a storage controller that carries out various controls and carries out various controls in response to a storage access request (access control signal, hereinafter referred to as a host I/O) from the host device 50.

As illustrated in FIG. 1, a CM 10 includes a Central Processing Unit (CPU) 11, a memory 12, the IOC 13, the CM-EXP 14a (14b), a Bootup and Utility Device (BUD) 16, a CM-BIOS memory 17, and CA 15a and 15b.

In the local storage 1-1, the CA 15a of each CM 10 is an adaptor that receives data transmitted from the host device 50 and transmits data output from the CM 10 to the host device 50. Namely, the CA 15a controls inputting and outputting data into and from the host device 50.

The CA 15a is a network adaptor that connects the local CM 10 to the host device 50 via, for example, a Network Attached Storage (NAS), and is exemplified by a LAN interface. The CMs 10 are connected to each other through the communication line 51 and via the host device 50 and the NAS, and receives an I/O request and receives and transmits data. In the example of FIG. 1, one CA 15a is provided to each of the CMs 10a and 10b.

The CA 15a of each CM 10 included in the local storage 1-1 functions as a target port to the host device 50.

These CAs 15a may be network adaptors that communicably connect their local CM 10 to the host device 50 through a Storage Area Network (SAN). Examples of a CA 15a may be an Internet Small Computer System Interface (iSCSI) interface, and a Fiber Channel (FC) interface. The CMs 10 are connected to each other via the host device 50 and the SAN through the communication line 51 by the CA 15a, and may receive an I/O request and receive and transmit data.

In contrast, the CA 15a of each CM 10 of the external storage 1-2 are communicably connected to the CA 15b of each CM 10 of the local storage 1-1 through the communication line 52.

The CA 15a of each CM 10 of the external storage 1-2 is an adaptor that receives data transmitted from the CMs 10 of the local storage 1-1 and transmits instructions and data output from the CMs 10 of the external storage 1-2 to the CMs of the local storage 1-1. Namely, the CA 15a of each CM 10 of the external storage 1-2 controls inputting and outputting data into and from the local storage 1-1, and functions as a target port to the local storage 1-1.

In contrast to the above, the CA 15b of each CM 10 of the local storage 1-1 controls inputting and outputting data into and from the external storage 1-2, and functions as an initiator port to the external storage 1-2.

In each CM10, multiple CAs 15a and 15b are included in a riser card (daughter card) 151 detachably configured from the CM 10. The CA 15b, which is an interface to be connected to the external storage 1-2 may be different in type from the CM-EXPs 14a and 14b, which are interfaces to the DE 20 being an internal storage.

The CM-EXPs 14a and 14b are expanded interfaces (Expanders) to communicably connect the CM 10 to the DE 20 and is exemplified by an Integrated Circuit (IC) chip. The CM-EXPs 14a and 14b function as switches that connects a CM 10 to the storing devices 21 provided to a DE 20.

Hereinafter, the reference number 14a or 14b is used when one of the multiple CM-EXPs needs to be specified, but a reference number 14 is used to refer to an arbitrary CM-EXP.

To the CM-EXP 14, the storing devices 21 of the CMs 10 are connected. Each CM 10 controls accesses to the storing devices 21 in response to an I/O request received from the host device 50.

Each CM 10 writes and reads data into and from the storing devices 21 through the CM-EXP 14. In the present embodiment, the CMs 10 included in each CE 2 and the IOMs 23 included in each DE 20 are modules (electronic devices) of targets of replacing firmware serving as programs. Hereinafter, an IOM 23 is sometimes referred to as a module or a part.

These modules are controlled by the CMs 10 belonging to the same series. The targets to be controlled by a CM 10 include electronic devices included in the CM 10 and electronic devices of the subordinate DEs 20 as well as the module. In the present storage system 100, all the electronic devices can be the target of replacing firmware (program), and all and part of these electronic devices undergo active firmware (program) replacement.

For example, each IOM 23 includes a storing region (memory, storing section) to store new firmware after the replacement. The IOM 23 replaces the firmware by, when the IOM 23 is started (when being started due to reset, rebooted, or restarted), reading the new firmware stored in the storing region and applying the read firmware to itself. Hereinafter, reset of an IOM 23 includes rebooting (restarting).

The CM-BIOS memory 17 stores a Basic Input Output System (BIOS) executed by the CPU 11 when the CM 10 is being restarted.

The memory 12 is a storing device including a Read Only Memory (ROM) and a Random Access Memory (RAM). In the ROM of the memory 12, a software program is written, which is occasionally read and executed by the CPU 11. The RAM of the memory 12 is used as a primary recording memory or a working memory, and temporarily stores the BIOS read from the CM-BIOS memory 17 and a software program. In an example of the present embodiment, the memory 12 stores volume information 121 and volume status information 122 that are to be detailed below (FIG. 3).

In addition, the memory 12 may store information (firmware replacement progress information) indicating the progress circumstance of the firmware replacement process and firmware version information indicating the version of the firmware.

An IOC 13 is a controller that controls data forwarding in the CM 10, and achieves Direct Memory Access (DMA) forwarding that forwards data stored in the memory 12 without passing through the CPU 11, for example.

A BUD 16 is a storing device that stores damp data copied from the CA 15, for example.

Each CPU 11 is a processing device that carries out various controls and arithmetic operations, and is exemplified by a multi-core processor (multi-core CPU). The CPU 11 achieves various functions through executing the Operating System (OS) and programs stored in, for example, the memory 12. As illustrated in FIG. 3, the CPU 11 of the local storage 1-1 functions as a power controller 114, a CA controller 111, an external storage manager 112, and a maintenance controller 110.

The program that achieves the functions of the power controller 114, the CA controller 111, the external storage manager 112, and the maintenance controller 110 is provided in the form of being stored in a computer-readable recording medium such as a flexible disk, a CD (e.g., CD-ROM, CD-R, CD-RW), a DVD (e.g., DVD-ROM, DVD-RAM, DVD-R, DVD+R, DVD-RW, DVD+RW, HD DVD), a Blu-ray disk, a magnetic disk, an optical disk, and a magneto-optical disk. The computer read the program from the storing medium, and forwards and stores the program into internal or external storing device (recording medium) for future use. Alternatively, the program recorded in a storing device such as a magnetic disk, an optical disk, and a magneto-optical disk, and may be provided to the computer from the storing device through a communication path.

In achieving the function of the power controller 114, the CA controller 111, the external storage manager 112, and the maintenance controller 110, a program stored in an internal storing device (in the present embodiment, the RAM or ROM of the memory 12) is executed by a microprocessor (in the present invention, the CPU 11) of a computer. For this purpose, the computer may read the program stored in the recording medium and execute the read program.

The power controller 114 carries out power-source control of the CM 10 and the devices, and controls on/off of the power sources of the CM 10 and the devices in order to, for example, apply (incorporate) firmware.

The CA controller 111 notifies another CM 10 of volumes of the external storage 1-2 that the CM 10 (hereinafter referred to as the local CM 10) in which the CA controller 111 functions recognizes. For example, the CM 10 stores the volume information 121 into a predetermined memory region of the memory 12. Information (e.g., volume IDs) that specifies volumes formed in the external storage 1-2 is registered in the volume information 121 beforehand.

The CA controller 111 confirms whether a volume having the volume ID registered in the volume information 121 is accessible through the communication line 52 and notifies the counterpart CM 10 forming a redundant configuration in the same CE 2 of the result of the confirmation (i.e., accessibility status information).

For example, the CA controller 111 issues a small Computer System Interface (SCSI) command to a volume to be confirmed, and determines, on the basis of the response to the SCSI command, whether the volume is accessible.

The CA controller 111 issues, as the SCSI command, an "INQUIRY COMMAND" that aims at obtaining the basic information related to the target device, for example. Upon receipt of "Data/Status" from the external storage 1-2 in response to the "INQUIRY COMMAND", the CA controller 111 issues, to the external storage, a "TEST UNIT READY" command to confirm whether the device is operable. The CA controller 111 determines whether the target volume is accessible on the basis of "Data/Status" that the external storage 1-2 transmits in response to "TEST UNIT READY".

If the volume of the external storage 1-2 is accessible from the CM 10, the access path from the CM 10 to the external storage 1-2 can be determined to be normal.

The CA controller 111 notifies accessibility status information indicating the access status of the local CM to a volume of the external storage 1-2 to the counterpart CM 10 in the redundant configuration.

The CA controller 111 may periodically confirm the accessibility status of the volumes of the external storage 1-2. Alternatively, the CA controller 111 may confirm the accessibility status of the volumes of the external storage 1-2 at appropriate timing such as the timing when a confirmation request is received from the counterpart CM 10 or the timing when an I/O access is issued from the host device 50.

The external storage manager 112 manages the path state (connecting state) of connection of the counterpart CM 10 (hereinafter simply referred to the counterpart CM 10) having the redundant path configuration with the local CM 10 to the external storage 1-2.

For example, the CM 10 stores the volume status information 122 in a predetermined region of the memory 12. In the volume status information 122, volume IDs that recognize all the volumes (virtual volumes) provided in the external storage 1-2 are registered.

In the volume status information 122, volume IDs of the volumes of the external storage 1-2 which volumes are accessible from the counterpart CM 10 and are notified from the CA controller 111 of the counterpart CM 10 are registered.

With this configuration, it is possible to easily discriminate, by referring to the volume status information 122, volumes that are provided to the external storage 1-2 and recognized by the counterpart CM 10 from volumes in the external storage 1-2 that are not recognized by the counterpart CM 10.

The volume status information 122 is preferably updated each time the CA controller 111 of the counterpart CM 10 notifies the volume IDs of the volumes of the external storage 1-2 to which volumes the counterpart CM 10 is accessible.

The external storage manager 112 may transmit a confirmation request that requests to confirm the accessibility status of the volumes of the external storage 1-2 to the counterpart CM 10, and update the volume status information 122 on the basis of a response from the counterpart CM 10 (the CA controller 111) to the confirmation request.

Upon receipt of a confirmation request for confirming the connecting state of the external storage 1-2 from the firmware replacement controller 113 that is to be detailed below, the external storage manager 112 refers to the volume status information 122. Thereby the external storage manager 112 confirms the path connecting state of the counterpart CM 10 to the external storage 1-2.

As a result of the confirmation, a volume of the external storage 1-2 to which the counterpart CM 10 is not accessible exists, the external storage manager 112 determines that an abnormality occurs in the path state (connecting state) to the external storage 1-2, and notifies the firmware replacement controller 113 of the abnormality.

The maintenance controller 110 receives a command that the user inputs via a Graphical User Interface (GUI) or a Command Line Interface (CLI) of a non-illustrated management terminal, and manages the sequence of the overall processing related to the maintenance such as updating of the firmware in the storage device 1.

As illustrated in FIG. 3, the maintenance controller 110 has a function as the firmware replacement controller 113.

The firmware replacement controller 113 carries out, on a device (electronic device) installed in the storage device 1, an active firmware replacement process that replaces (switches, version-updates) the firmware while the system is kept to be in the operating state. The active firmware replacement process is also referred to as an active firmware switching process, an active firmware application process, and an active firmware version-updating process.

Hereinafter, among the multiple CMs 10 installed in the storage device 1, a CM 10 which is carrying out the active replacement process on another CM 10 is sometimes referred to as a master CM 10. In contrast, a CM 10 being subjected to the active firmware replacement process by the master CM 10 is sometimes referred to as a slave CM 10. The slave CM 10 corresponds to the replacement target CM 10, which is the target for firmware replacement. The master CM 10 carries out the active firmware replacement process on the slave CM 10.

The function of the firmware replacement controller 113 is executed by the master CM 10.

In executing the active firmware replacement process in the storage device 1, multiple modules provided to the storage 1-1 is classified into two groups of the first-half module group and the second-half module group and replace the firmware of one of the groups at a time while the online state of the storage device 1 is kept.

The active firmware replacement process is assumed to be started under a state where the new firmware is written in a storing region (non-operating-side region) of a memory, for example. The active firmware replacement process is accomplished in two stages of the first half and the second half.

In applying firmware (hereinafter referred to new firmware) for updating to a module, the new firmware is firstly written into the non-operating-side region. After that, the non-operating-side region in which the new firmware is written is switched to an operating-side region and then the module is reset (rebooted, restarted) so that the module is restarted using the new firmware written in the operating-side region.

During the active firmware replacement process, a CM 10 of the target for firmware replacement is temporarily disconnected from the system. Therefore, the CM 10 of the target for firmware replacement is also referred to as a disconnecting target CM 10.

In the storage device 1 illustrated in FIG. 2, the 1-series modules undergo the replacement and then the modules provided to the CM #1 undergo the replacement at the first half. This first-half firmware rewriting is carried out under the control of the firmware replacement controller 113 of the CM #0.

After that, the modules provided to the CM #0 undergo the replacement and then the 0-series modules undergo the replacement at the second half. This second-half firmware rewriting is carried out under the control of the firmware replacement controller 113 of the CM #1.

For example, the firmware replacement controller 113 issues a firmware switching command to the IOM 23 of the target of switching the firmware. Upon receipt of the firmware switching command, the IOM 23 replies, when being in a state of correctly operating and also in a state where the new firmware is stored in the storing region thereof, to the firmware replacement controller 113 with a normal response. In contrast, when the IOM 23 is in a state where the new firmware is not stored in the storing region thereof, the IOM 23 replies to the firmware replacement controller 113 with an error response (abnormal response) indicating the state.

In the above example, the CM #0 functions as the master CM 10 during the first-half firmware rewriting and the CM #1 functions as the master CM 10 during the second-half firmware rewriting.

In other words, the multiple CMs 10 included in the storage device 1 alternately function as the master CM 10 that carries out the active firmware replacement process on the counterpart CM 10 (slave CM 10).

Furthermore, the active firmware replacement process has two modes of an automatic mode and an operator-aided mode.

In the automatic mode, only the OS and the firmware in the CM 10 are updated without accompanying turning on and off (ON/OFF) of the power source of the hardware. In cases where an active firmware replacement process is carried out on a CM 10 in the automatic mode, the firmware of the CA 15a, 15b, and the BIOS are not updated but the process can update the firmware in a short time without affecting the I/O on the side of the host device 50.

In the operator-aided mode, the firmware is updated accompanying turning on/off of the power source of the hardware. In cases where an active firmware replacement process is carried out on a CM 10 in the operator-aided mode, the links of the CA 15*a* and 15*b* are disconnected and it takes a time to reboot the CM 10. For the above, the host device 50 carries out on-line/off-line process on the I/O path. In the operator-aided mode, the firmware of CAs 15*a* and 15*b* and the BIOS firmware requiring turning on/off the power source can be updated.

Furthermore, the firmware replacement controller 113 has a firmware managing function that manages various types of information related to the firmware of the modules (e.g., parts) of the present storage device 1. The firmware replacement controller 113 manages the progress status of switching the firmware. The firmware managing function and the firmware switching progress managing function may be achieved by various known methods, so the description is omitted here.

In the master CM 10, the firmware replacement controller 113 controls to cause the external storage manager 112 to confirm the path state (connecting state) to the external storage 1-2.

The firmware replacement controller 113 confirms whether the storage virtualization function is validated in the present storage system 100. In the present storage system 100, information (e.g., a flag) indicating whether or not the storage virtualization function is validated is recorded in a predetermined storing region in the memory 12 of each CM 10.

The firmware replacement controller 113 confirms whether the storage virtualization function is validated in the present storage system 100 by confirming the status of the flag.

In cases where the storage virtualization function is validated in the present storage system 100, the firmware replacement controller 113 causes the external storage manager 112 to confirm the path state (path connecting sate) to the external storage 1-2 as described above.

In cases where a volume of the external storage 1-2 that is not accessible from the slave CM 10 is present, the path connecting state to the external storage 1-2 is determined to have an abnormality.

In cases where the connecting state to the external storage 1-2 is detected to have an abnormality, the firmware replacement controller 113 carries out one of the following processes (1) to (3) as an abnormal process, according to the progress of the active firmware replacement.

(1) Before the firmware replacement of the first-half module group:

In cases where the slave CM 10 is determined to have an abnormality occurring on the path connecting state to the external storage 1-2 before the firmware replacement of the first-half module group when the active firmware replacement is in the automatic mode, the firmware replacement controller 113 aborts the firmware replacement.

If the active firmware replacement process is in the operator-aided mode, the firmware replacement controller 113 notifies the operator of confirmation as to whether the firmware replacement is to be executed (confirmation notification). This confirmation notification may be carried out by, for example, displaying a message confirming whether the firmware replacement is to be carried out on a non-illustrated displaying device along with the message that the slave CM 10 does not find the volume of the external storage 1-2.

(2) before the firmware replacement of the second-half module group after the firmware replacement of the first-half module group:

In cases where the slave CM 10 is determined to have an abnormality occurring on the path connecting state to the external storage 1-2 before the firmware replacement of the second-half module group after the firmware replacement of the first-half module group, the firmware replacement controller 113 restores the replaced firmware of the modules of the first-half module group to the respective previous versions. In other words, the firmware replacement controller 113 carries out a roll-back process. The firmware replacement of the second-half module group is aborted.

(3) after the firmware replacement of the second-half module group:

In cases where the slave CM 10 is determined to have an abnormality occurring on the path connecting state to the external storage 1-2 after the firmware replacement of the second-half module group, the firmware replacement controller 113 notifies the operator of a message that the slave CM 10 does not find the volume of the external storage 1-2. This notification may be carried out by displaying a notification indicating that the slave CM 10 does not find a volume of the external storage 1-2 on a non-illustrated displaying device.

Figure 4:
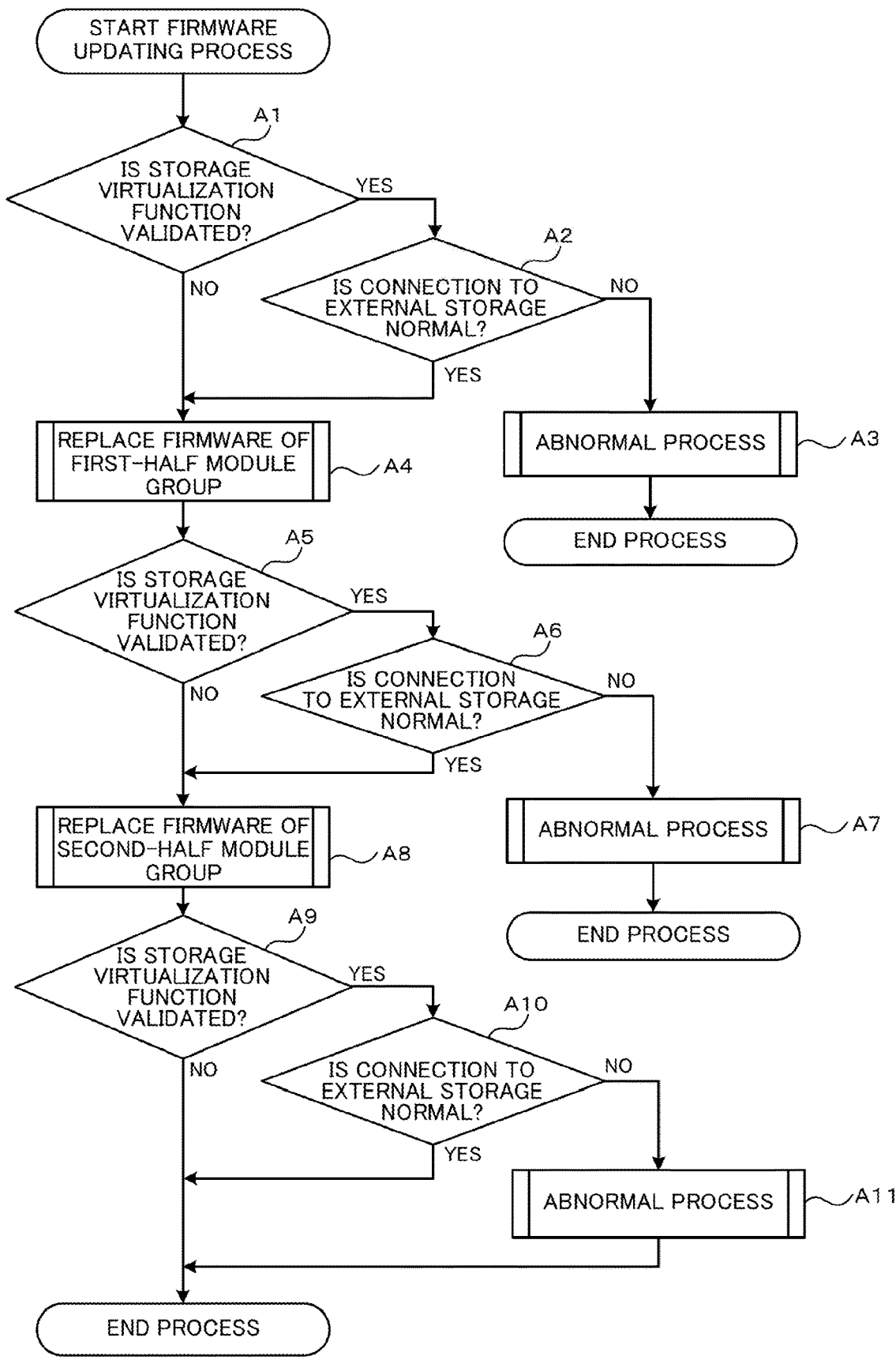
FIG. 4 is a flow diagram illustrating a process of firmware replacement of a local storage of a storage system according to an example of an embodiment.

(C) Operation:

Description will now be made in relation to a process of firmware replacement of the local storage 1-1 in the storage system 100 having the above-described configuration according to an example of an embodiment with reference to the flow diagram (Steps A1-A11) of FIG. 4.

In the following example, first of all, the f active firmware replacement to the first-half module group is accomplished by carrying out the firmware replacement of the 1-series modules and then the firmware replacement of the modules installed in the CM #1. After that, the active firmware replacement to the second half-module group is accomplished by carrying out the firmware replacement of the 0-series modules of the 0-series and then the firmware replacement of the modules installed in the CM #0.

In Step A1, the firmware replacement controller 113 of the CM #0 (master CM 10) that controls the firmware replacement of the 1-series module group confirms whether the storage virtualization function is validated in the present storage system 100.

In cases where the storage virtualization function is validated (see YES route in Step A1) as a result of the confirmation, the process moves to Step A2. Instep A2, the firmware replacement controller 113 of the master CM #0 confirms whether the connection between the slave CM #1 and the external storage 1-2 is normal.

Figure 5:
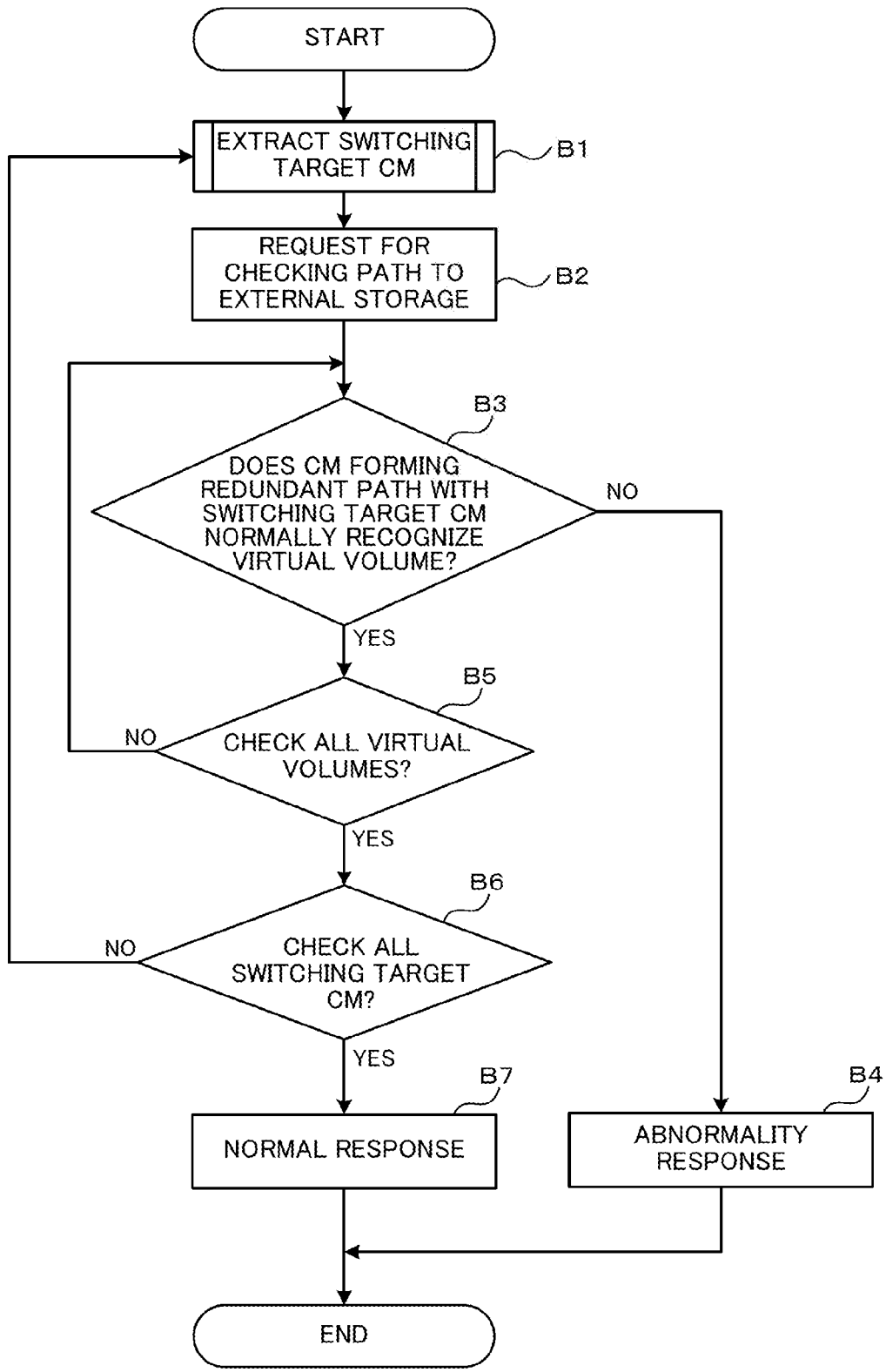
FIG. 5 is a flow diagram illustrating a method of confirming a connecting state between a slave CM in a local storage and an external storage in a storage system according to an example of an embodiment.

The detailed manner of the confirmation as to whether the connection between the slave CM #1 and the external storage 1-2 is normal will be described blow with reference to the flow diagram of FIG. 5.

In cases where an abnormality is detected in the connection between the slave CM #1 and the external storage 1-2 as a result of the confirmation in Step A2 (see NO route in Step A2), the firmware replacement controller 113 carries out an abnormal process in Step A3.

The process in Step A3 corresponds to one performed when the slave CM 10 is determined to have an abnormality occurring on the path connecting state to the external storage 1-2 before the firmware replacement of the first-half module group detailed above.

In cases where the active firmware replacement process is in the automatic mode, the firmware replacement controller 113 aborts the firmware replacement. In contrast, in cases where the active firmware replacement process is in the operator-aided mode, the firmware replacement controller 113 issues confirmation notification as to whether or not the firmware replacement is to be carried out to the operator, and then terminates the process.

In cases where the connection between the slave CM #1 and the external storage 1-2 is normal as a result of the confirmation in Step A2 (YES route in Step A2), the process moves to Step A4.

In addition, in cases where the storage virtualization function is not validated (see NO route in Step A1) as a result of the confirmation in Step A1, the process also moves to Step A4.

In Step A4, the firmware replacement controller 113 of the master CM #0 carries out the firmware replacement of the devices of the first-half module group. After completion of the firmware replacement of the 1-series modules, the 1-series CM #1 comes to be the new master CM 10 that controls the firmware replacement of the 0-series modules.

In Step A5, the firmware replacement controller 113 of the CM #1 (master CM 10) confirms whether the storage virtualization function is validated in the present storage system 100.

In cases where the storage virtualization function is validated (see YES route in Step A5) as a result of the confirmation, the process moves to Step A6. Instep A6, the firmware replacement controller 113 of the master CM #1 confirms whether the connection between the slave CM #0 and the external storage 1-2 is normal.

In cases where an abnormality is detected in the connection between the slave CM #0 and the external storage 1-2 as a result of the confirmation in Step A6 (see NO route in Step A6), the firmware replacement controller 113 carries out an abnormal process in Step A7.

The process in Step A7 corresponds to one performed when the slave CM 10 is determined to have an abnormality occurring on the path connecting state to the external storage 1-2 before the firmware replacement of the second-half module group after the firmware replacement of the first-half module group detailed above.

The firmware replacement controller 113 of the master CM #1 restores the replaced firmware of each module of the first-half module group replaced to the previous version. Namely, the firmware replacement controller 113 carries out a roll-back process. The firmware replacement controller 113 aborts the firmware replacement of the second-half module group, and then terminates the process.

In cases where the connection between the slave CM #0 and the external storage 1-2 is normal as a result of the confirmation in Step A6 (see YES route in Step A6), the process moves to Step A8.

In addition, in cases where the storage virtualization function is not validated (see NO route in Step A5) as a result of the confirmation in Step A5, the process also moves to Step A8.

In Step A8, the firmware replacement controller 113 of the master CM #1 carries out the firmware replacement of the devices of the second-half module group.

In Step A9, the firmware replacement controller 113 of the CM #1 (master CM 10), which has performed the firmware replacement in Step A8, confirms whether the storage virtualization function is validated in the present storage system 100.

In cases where the storage virtualization function is validated (see YES route in Step A9) as a result of the confirmation, the process moves to Step A10. In step A10, the firmware replacement controller 113 of the master CM #1 confirms whether the connection between the slave CM #0 and the external storage 1-2 is normal.

In cases where an abnormality is detected in the connection between the slave CM #0 and the external storage 1-2 (see NO route in Step A10) as a result of the confirmation in Step A10, the firmware replacement controller 113 carries out an abnormal process in Step A11.

The process in Step A11 corresponds to one performed when the salve CM 10 is determined to have an abnormality occurring on the path connecting state to the external storage 1-2 after the firmware replacement of the second-half module group detailed above.

The firmware replacement controller 113 of the master CM #1 notifies the operator that the volumes of the external storage 1-2 are not found from the slave CM 10, and terminates the process.

In cases where the connection between the slave CM #0 and the external storage 1-2 is normal (see YES route in Step A10) as a result of the confirmation of Step A10, the firmware replacement controller 113 terminates the process.

In addition, in cases where the storage virtualization function is not validated (see NO route in Step A9) as a result of the confirmation of Step A9, the firmware replacement controller 113 terminates the process.

Next, description will now be made in relation to the manner of confirming the connecting state between the slave CM 10 in the local storage 1-1 and the external storage 1-2 in the storage system 100 according to an example of an embodiment with reference to the flow diagram (Steps B1-B7) of FIG. 5.

In Step B1, the firmware replacement controller 113 of the master CM 10 extracts a CM 10 (switching target CM 10) of the target for the firmware replacement.

In some cases, four or more (e.g., twelve) CMs 10 may be provided to the storage system 100. Respective arbitrary identification numbers are set for the multiple CMs 10. For example, among 12 CMs #0 to #11, identification numbers 10, 11, 12, . . . , and 1B may be set for the CMs #0, #2, #4, . . . , and #10, respectively, and identification numbers 20, 21, 22, . . . , and 2B may be set for the CMs #1, #3, #5, . . . , and #11, respectively.

Each of the multiple CMs 10 is preferably made into a redundant configuration (paired) with one of the other CMs 10. A pair of CMs 10 may be installed in the same CE 2. For example, in the storage system 100 including 12 CMs 10 (CM #0 to CM #11), the CM #0 and the CM #1 may be paired and installed in the CE #0. Likewise, a pair of the CM #2 and the CM #3 may be installed in the CE #1; a pair of the CM #4 and the CM #5 may be installed in the CE #2; a pair of the CM #6 and the CM #7 may be installed in the CE #3; a pair of the CM #8 and the CM #9 may be installed in the CE #4; and a pair of the CM #10 and the CM #11 may be installed in the CE #5. The identification numbers and the pair configuration of the CMs 10 may be variously modified.

In regard of each pair of CMs 10, in cases where one of the CMs 10 is assumed to be a replacement target CM 10 of the target for the firmware replacement, the other CM 10 is regarded as the counterpart CM 10 having a redundant connecting path with the replacement target CM 10. A replacement target CM 10 bass the same meaning as a disconnection target CM 10.

Among the pairs of CMs 10, the CM #0, #2, #4, #6, #8, and #10 specified by even numbers are regarded as 0 series, and the CM #1, #3, #5, #7, #9, and #11 specified by odd numbers are regarded as the 1 series.

In cases where the storage system 100 includes multiple target CMs 10 of the targets for the firmware replacement, one switching target CM 10 is extracted (selected) from the multiple switching target CMs 10. A switching target CM 10 is a slave CM 10.

In Step B2, the firmware replacement controller 113 notifies the external storage manager 112 of the switching target CM 10 and requests the external storage manager 112 to confirm the connecting state of the counterpart CM 10 having a redundant configuration with the switching target CM 10 and the external storage 1-2.

In Step B3, the external storage manager 112 confirms whether the slave CM 10 recognizes each individual volume (virtual volume) installed in the external storage 1-2 by referring to the volume status information 122.

This confirmation is repeated until all the volumes installed in the external storage 1-2 is completed (Step B5). In cases where a volume not being confirmed yet is present (see NO route in Step B5), the process of Step B3 is repeated.

As a result of the confirmation in Step B3, in cases where the volumes installed in the external storage 1-2 includes one that the slave CM 10 does not recognize is present (see NO route in Step B3), the external storage manager 112 replies with the firmware replacement controller 113 with an abnormal response in Step B4, and terminates the process.

In contrast, in cases where all the volumes installed in the external storage 1-2 are confirmed to be recognized by the slave CM 10 (see YES route in Step B5), the process moves to Step B6.

In Step B6, confirmation is made as to whether the processes of Steps B3-B5 is performed on all the switching target CMs 10. In cases where one or more of the switching target CMs 10 have not undergone the confirmation of the volume recognition (see NO route in Step B6), the process returns to Step B1.

In cases where all the switching target CMs 10 have undergone the confirmation of the volume recognition (see YES route in Step B6), the external storage manager 112 replies to the firmware replacement controller 113 with a normal response, and terminates the process.

Figure 6:
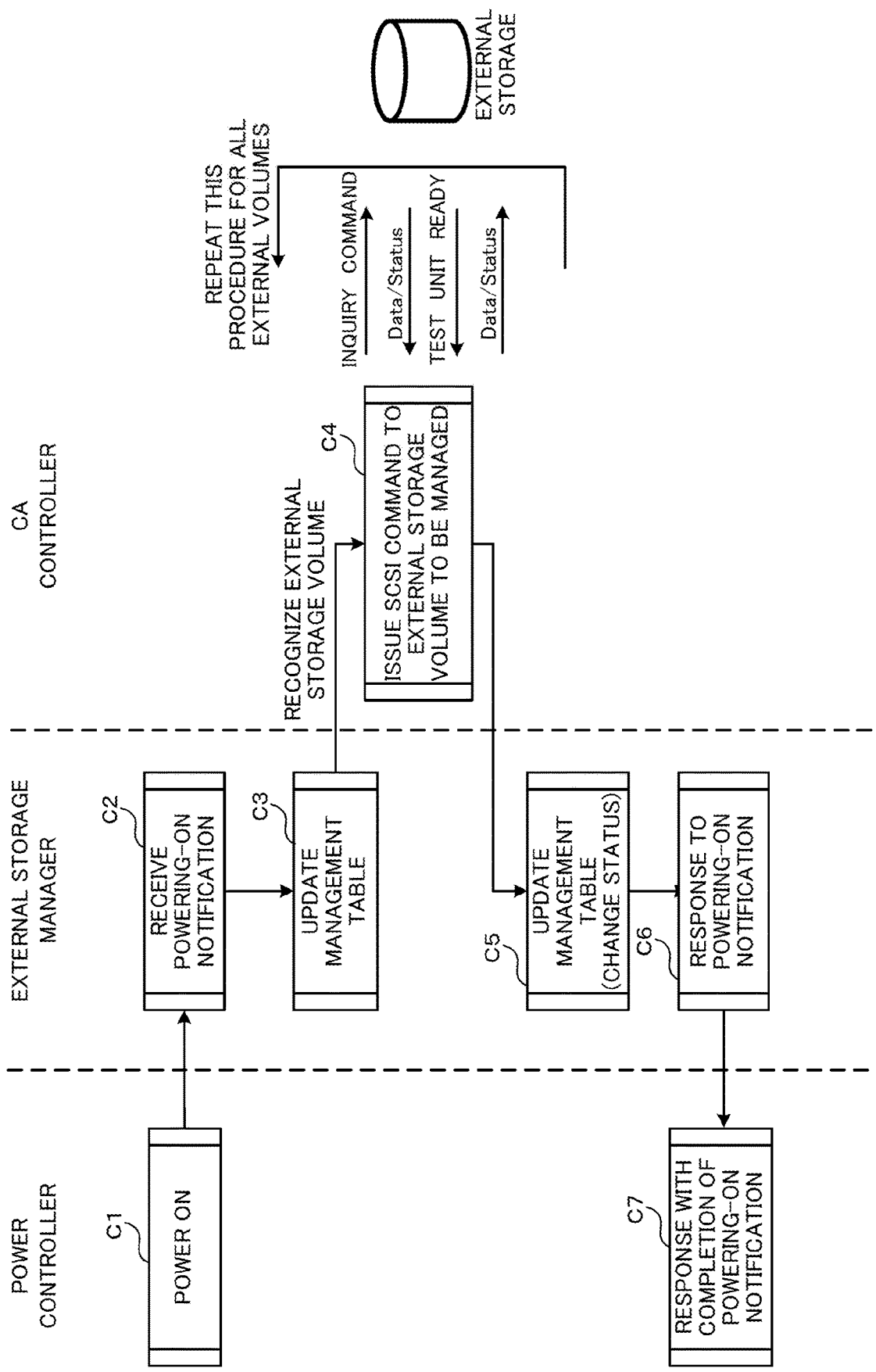
FIG. 6 is a flow diagram illustrating a process performed when a CM is to be incorporated in a course of firmware replacement in a local storage of a storage system according to an example of an embodiment.

Next, description will now be made in relation to a process performed when a CM 10 is being incorporated in the course of the firmware replacement in the local storage 1-1 of the storage system 100 of an example of an embodiment with reference to the flow diagram (Steps C1-C7) of FIG. 6.

In the active firmware replacement process in the local storage 1-1, the power controller 114 reboots one of the redundant CMs 10 at each time. In Step C1, when the CM 10 is started, the power controller 114 issues powering-on notification to the external storage manager 112.

In Step C2, the external storage manager 112 receives the powering-on notification.

In Step C3, the external storage manager 112 updates the volume status information 122.

The volume status information 122 stores an abnormal status as the initial value for each volume in the external storage 1-2 when the CM 10 is being rebooted.

The external storage manager 112 transmits a confirmation request that requests confirmation of the access state to each volume of the external storage 1-2 to the CA controller 111 of the counterpart CM 10.

In Step C4, the CA controller 111 of each CM 10 confirms the path connecting state of each volume of the corresponding external storage 1-2 by issuing an SCSI command to the volume.

The CA controller 111 notifies the external storage manager 112 that is the sender of the confirmation request of information about one or more volumes in the external storage 1-2 each to which the SCSI command is successfully issued and which is successfully recognized.

In Step C5, the external storage manager 112 manages the information about the volumes notified from the CA controller 111 by registering the information in the volume status information 122 for each CM 10.

In Step C6, the external storage manager 112 replies the power controller 114 in response to the powering-on notification, and in Step C7, the power controller 114 responses with the completion of powering-on of the CM 10 and terminates the process.

(D) Effects:

As described above, in the event of the active firmware replacement, the storage device 1 of an example of an embodiment confirms the path connecting state of a counterpart CM 10 (e.g., CM #1), which has a redundant configuration with the switching target CM 10 (e.g., CM #0) of the target for the firmware replacement, to the external storage 1-2.

In cases where an abnormality is detected in the connecting state of the counterpart CM 10 to the external storage 1-2 as a result of the path confirmation of the path connecting state, the firmware replacement process on the switching target CM 10 is aborted. In cases where no abnormality is detected in the connecting state of the counterpart CM 10 to the external storage 1-2, the firmware replacement process is carried out on the switching target CM 10.

This makes it possible to carry out the active firmware replacement process on the switching target CM 10 under a state where the connection of the counterpart CM 10 to the external storage 1-2 is normal. Consequently, even when the switching target CM 10 is rebooted in the course of the active firmware replacement process, the path connection between the local storage 1-1 and the external storage 1-2 is not lost. This can enhance the system reliability.

In contrast, in cases where an abnormality is detected in the connecting state of the counterpart CM 10 to the external storage 1-2 as a result of the confirmation of the path connecting state under a state where the active firmware replacement process is in the operator-aided mode, confirmation notification as to whether or not the firmware replacement is to be carried out is issued to the operator. This makes it possible to take measure in obedience of the intention of the operator, which enhances the convenience.

In cases where an abnormality is detected in the path connecting state of the counterpart CM 10 to the external storage 1-2 before the firmware replacement of the second-half module groups after the firmware replacement of the first-half module group, the firmware replacement of the second-half module group is aborted. In addition, a roll-back process that restores the replaced firmware of the first-half module groups to the previous versions to the replacement is carried out. This can rapidly restore the storage system 100 to the normal state before the abnormality occurs in the course of the firmware replacement, which can enhance the reliability.

In cases where abnormality is detected in the path connecting state of the counterpart CM 10 to the external storage 1-2 after the firmware replacement of the second-half module group, notification that the slave CM 10 does not find the volumes of the external storage 1-2 is issued to the operator. Since this case means that the present storage system 100 is in an abnormal state where the counterpart CM 10 is unable to access the volumes of the external storage 1-2 although the new firmware is completed to be applied, the operator can rapidly recognize the abnormal state and the convenience of the storage system 100 can be enhanced.

The external storage manager 112 of the master CM 10 determines the path connecting state of the counterpart CM 10 to the external storage 1-2 on the basis of whether the redundant CM 10 is accessible to the volumes installed in the external storage 1-2. This provides high convenience because the path connecting state of the redundant CM 10 to the external storage 1-2 can be easily grasped.

(E) Miscellaneous:

The technique disclosed herein is not limited to the above embodiments, but various changes and modification can be suggested without departing from the scope of the foregoing embodiment. The respective configurations and steps of the embodiment can be selected, omitted, or combined according to the requirement.

For example, the hardware configuration of the bus storage device 1 is not limited to one exemplified by FIGS. 1 and 2, but may be variously modified.

More specifically, the storage device 1 is not limited to one having a low-end or middle-range device configuration exemplarily illustrated in FIGS. 1 and 2. The embodiment may be applied to the storage device 1 provided to a so-called high-end storage system 100 as illustrated in FIG. 7.

Figure 7:
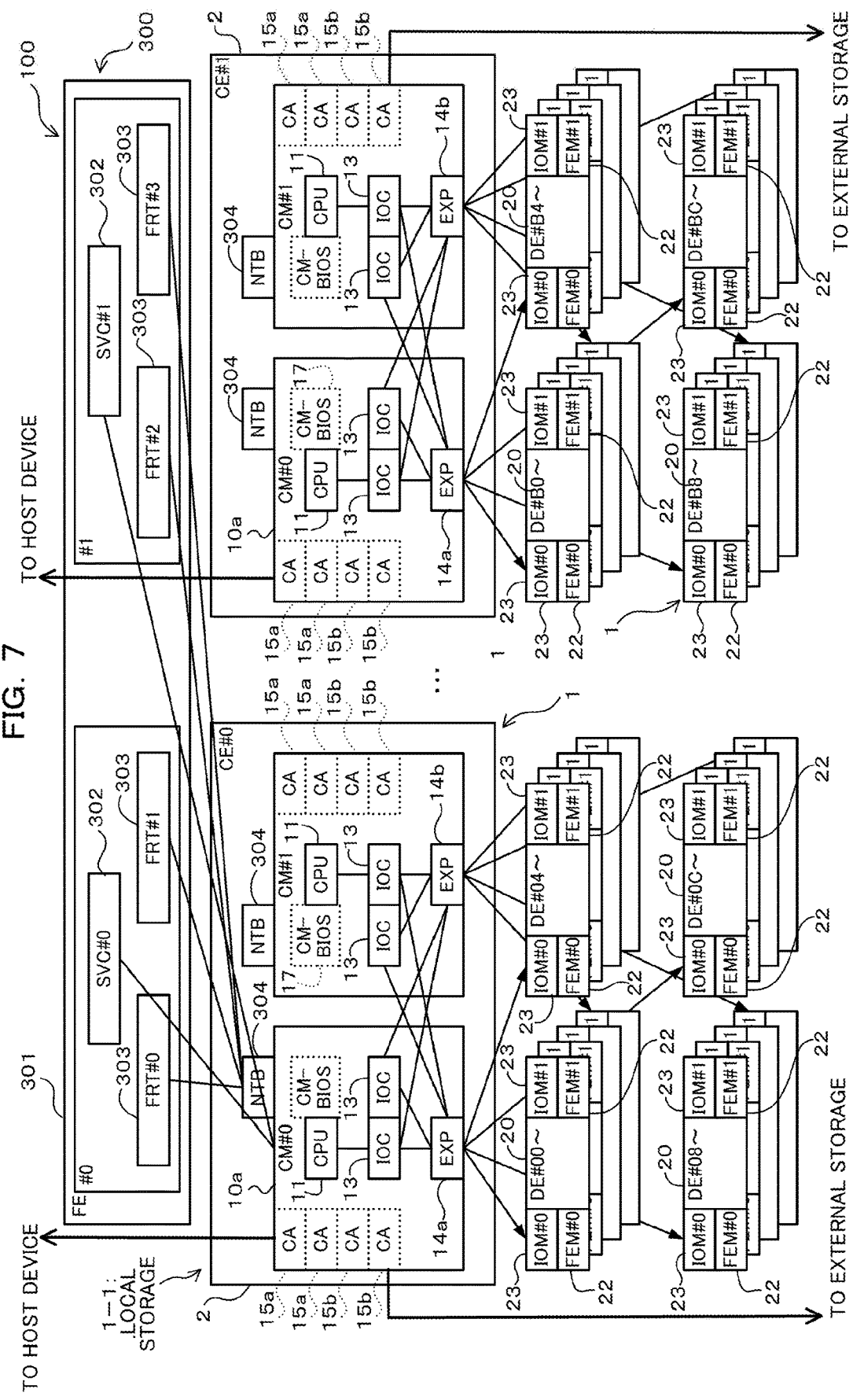
FIG. 7 is a diagram illustrating an example of the configuration of a high-end storage system.

A local storage 1-1 provided to the storage system 100 of FIG. 7 includes a Front Enclosure (FE) 301 and multiple (two in the example of FIG. 7) CEs 2. Like reference numbers designate the same or substantially same parts and elements throughout the drawings, so repetitious description is omitted here. For the convenience, FIG. 7 omits illustration of a part of the configuration.

The FE 301 is a connecting device to connect multiple CMs 10 thereto and includes two units (#0 and #1) each combining a single Service Controller (SVC) 302 and two Front-End Routers (FRTs) 303. The SVCs 302 and the FRTs 303 in the FE 301 are connected to the CMs 10a and 10b via respective Non Transparent Bridge (NTB) 304.

In each CE 2 of the local storage 1-1, each CM 10 is connected to the host device (not illustrated) via the CA 15a. Each CM 10 is connected to the CMs 10 of the external storage 1-2 (not illustrated) likewise configured via the CA 15a.

In the local storage 1-1 of FIG. 7, a part of illustration such as wiring is omitted for convenience. For example, wiring from the CM #1 of the CE #0 and the CM #0 and the CM #1 of the CE #1 to the FE 301 is omitted. In each CE2 in the local storage 1-1, the CA 15a of the CM #0 is connected to the host device 50 and the CA 15b of the CM #0 is connected to the external storage 1-2.

This configuration allows each of the CMs 10a and 10b to communicate other CMs 10a and 10b via either FRT 303. The communication path between the CMs 10a and 10b are made to be redundant in the storage system 100.

In the storage system 100 of FIG. 7, the CA 15b serving as the interface connected to the external storage 1-2 may be of a type different from the CM-EXP 14a and 14b serving as the interfaces to the internal storage DEs 20.

The foregoing embodiment describes an example of replacing the firmware of the electronic devices in each CM 10 and the electronic device of a DE 20 subordinate to the CM 10, but is not limited to this. Alternatively, the foregoing embodiment may be applied to replacement of a program except for the firmware or may be applied to the replacement of a program of an electronic devices except for those included in each CM 10 or each DE 20.

The embodiment can be carried out and manufactured by those ordinary skilled in the art with reference to the above disclosure.

According to an embodiment, occurrence of the system down can be inhibited when active firmware replacement process is carried out in the storage system 100 configured by connecting multiple storage devices 1-1 and 1-2.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A storage system comprising:
   a first storage device that is communicably connected to a host device; and
   a second storage device that is communicably connected to the first storage device and that performs a process through the first storage device in response to an access request from the host device, wherein,
   the first storage device comprises a first storage controller and a second storage controller, the first storage controller and the second controller being redundantly connected to the host device;
   the first storage controller and the second controller are redundantly connected to the second storage device;
   before the first storage controller disconnects a connection from the second storage device to carry out active program replacement, the first storage controller confirms a communication state between the second storage controller and the second storage device; and
   in a case where an abnormality is detected in the communication state between the second storage controller and the second storage device, the active program replacement of the first storage controller is prohibited.

2. The storage system according to claim 1, wherein
   before the second storage controller disconnects a connection from the second storage device to carry out active program replacement, the second storage controller confirms a communication state between the first storage controller and the second storage device; and
   in a case where an abnormality is detected in the communication state between the first storage controller and the second storage device, the active program replacement of the second storage controller is prohibited.

3. The storage system according to claim 1, wherein the confirming of the communication state between the second storage controller and the second storage device is based on a circumstance of a data access from the second storage controller to a logical volume subordinate to the second storage device.

4. The storage system according to claim 1, wherein
   in a case where an abnormality is detected in the communication state between the second storage controller and the second storage device after active program replacement of a part or an entire part of a plurality of electronic parts controlled by the first storage controller is completed, a program applied to the part or the entire part by the active program replacement is restored to a program applied before the active program replacement.

5. The storage system according to claim 1, wherein
in a case where an abnormality is detected in the communication state between the second storage controller and the second storage device after active program replacement of a part or an entire part of a plurality of electronic parts controlled by the first storage controller is completed,
an alert indicating that the abnormality is detected in the communication state is issued.

6. A storage controller provided to a first storage device communicably connected to a host device and a second storage device, the storage controller comprising:
a first communicator that is communicably connected to the host device;
a second communicator that is communicably connected to the second storage device; and
a maintenance controller that disconnects a connection from the second storage device and carries out an active program replacement, wherein
the maintenance controller
confirms a communication state between a redundant storage controller having a redundant configuration with the storage controller and the second storage device before the active program replacement is carried out; and
prohibits, in a case where an abnormality is detected in the communication state between the redundant storage controller and the second storage device, the active program replacement of the storage controller.

7. The storage controller according to claim 6, wherein the confirming of the communication state by the maintenance controller is based on a circumstance of a data access from the redundant storage controller to a logical volume subordinate to the second storage device.

8. The storage controller according to claim 6, wherein
in a case where an abnormality is detected in the communication state between the redundant storage controller and the second storage device after active program replacement of a part or an entire part of a plurality of electronic parts controlled by the storage controller is completed,
the maintenance controller restores a program applied to the part or the entire part by the active program replacement to a program applied before the active program replacement.

9. The storage controller according to claim 6, wherein
in a case where an abnormality is detected in the communication state between the redundant storage controller and the second storage device after active program replacement of a part or an entire part of a plurality of electronic parts controlled by the storage controller is completed,
the maintenance controller issues an alert indicating that the abnormality is detected in the communication state.

10. A non-transitory computer-readable recording medium having stored therein a storage controlling program which causes a processor of a storage controller provided to a first storage device communicably connected to a host device and a second storage device to carry out a process comprising:
confirming a communication state between a redundant storage controller having a redundant configuration with the storage controller and the second storage device before the maintenance controller disconnects a connection from the second storage device and carries out an active program replacement; and
prohibiting, in a case where an abnormality is detected in the communication state between the redundant storage controller and the second storage device, the active program replacement of the storage controller.

11. The non-transitory computer-readable recording medium according to claim 10, wherein the confirming of the communication state is based on a circumstance of a data access from the redundant storage controller to a logical volume subordinate to the second storage device.

12. The non-transitory computer-readable recording medium according to claim 10, wherein the process further comprises
in a case where an abnormality is detected in the communication state between the redundant storage controller and the second storage device after active program replacement of a part or an entire part of a plurality of electronic parts controlled by the storage controller is completed,
restoring a program applied to the part or the entire part by the active program replacement to a program applied before the active program replacement.

13. The non-transitory computer-readable recording medium according to claim 10, wherein the process further comprises
in a case where an abnormality is detected in the communication state between the redundant storage controller and the second storage device after active program replacement of a part or an entire part of a plurality of electronic parts controlled by the storage controller is completed,
issuing an alert indicating that the abnormality is detected in the communication state.

* * * * *